No. 648,802. W. H. SEWELL. Patented May 1, 1900.
TIRE FOR CYCLES OR OTHER VEHICLES.
(Application filed July 13, 1899.)
(No Model.)
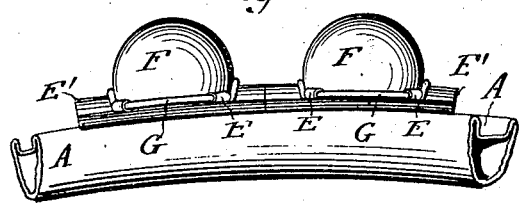
Fig. 1.
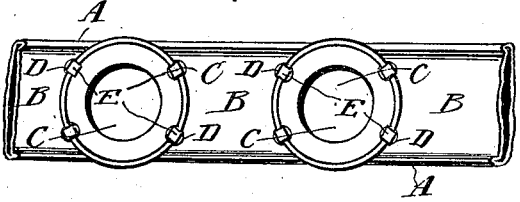
Fig. 3.
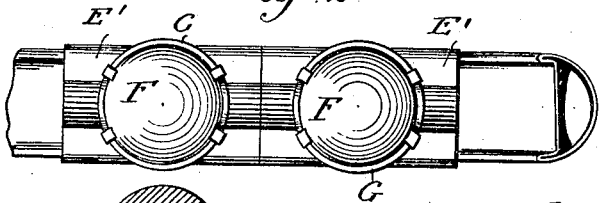
Fig. 2.
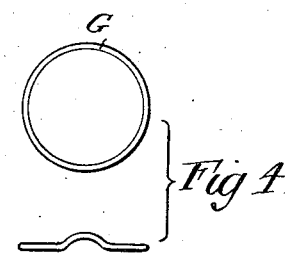
Fig. 4.
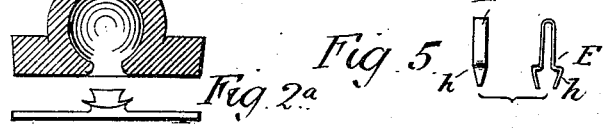
Fig. 2ª. Fig. 5. Fig. 7. Fig. 1ª.
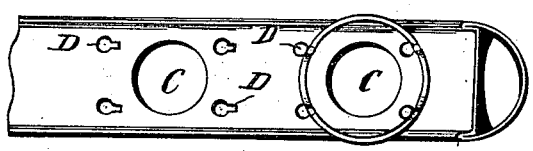
Fig. 6.
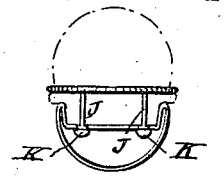
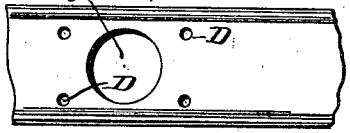
Fig. 8.
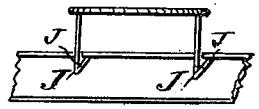
Fig. 9.
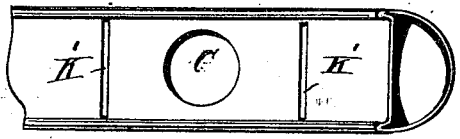
Fig. 10.
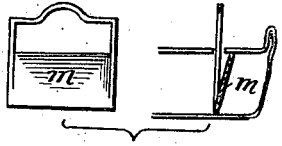
Fig. 11.
Witnesses:
W. M. Manning.
E. K. Allen.
Inventor:
William Herbert Sewell,
By Knight Bros.
Attys.

UNITED STATES PATENT OFFICE.

WILLIAM HERBERT SEWELL, OF PORT STEWART, IRELAND.

TIRE FOR CYCLES OR OTHER VEHICLES.

SPECIFICATION forming part of Letters Patent No. 648,802, dated May 1, 1900.

Application filed July 13, 1899. Serial No. 723,729. (No model.)

*To all whom it may concern:*

Be it known that I, WILLIAM HERBERT SEWELL, general produce merchant, of Harbour View, Port Stewart, county of Derry, Ireland, have invented Improvements in and Connected with the Tires of Cycles, Carriages, or other Vehicles, (for which I have obtained a patent in Great Britain, No. 26,833, and bearing date December 20, 1898,) of which the following is a specification.

My invention relates to improvements in and connected with the tires of cycles, carriages, and other vehicles, and is a further development of my prior United States of America patent, No. 620,507, and dated the 28th day of February, 1899, and has for its object the providing a somewhat-simplified form of section and a more effective form of attachment instead of the inflated ball or section being attached to rim of wheel, but its flange or upper part passing through and bearing on rim-face. I now propose that the ball be simply placed on or against rim-face, where it is rigidly held in position or borne by a circumferential ring passed over ball, said ring being held in position by spring or projecting arms or clips having heads. These arms or clips will pass through an orifice in flange of ball and will latch, hook, or button themselves on or within rim-face, which latter is provided with suitable openings to receive same, the effect being that the rim is circumferentially protected or covered by rubber segments, but the running is on an intermittent series of spherical and inflated pneumatic points.

Figure 1 is a longitudinal section of part of rim of wheel and tire of cycle, showing my improvements. Fig. 1ª is a separate view showing more clearly the barbed head of clip bearing within rim. Fig. 2 is a plan. Fig. 2ª is a section showing construction of ball. Fig. 3 is a detached view in plan of part of rim of wheel with tire removed and attachment-ring in position. Fig. 4 is a detached view in plan and side elevation of attachment-ring which encircles the ball and bears against the elongated buffer-flanges. Fig. 5 is a separate view, in front and side elevation, of the radial arms or spring-clips with barbed and arrow head, which fitting over the ring passes through the flange of ball and suitable openings on rim-face and latches on latter. Figs. 6 and 7, 8 and 9, and 10 and 11 are views of different modifications of a spring or catch attachment engaging with, on, or within rim in a suitable manner.

A is the rim of the wheel, (wood or metal,) having the ground face B, provided with circular openings C at suitable distances apart to provide for an upward expansion of segment when ground tread is under pressure, thereby suspending and absorbing vibration, and D represents the small holes through which the spring-clips E pass.

E' represents the elongated buffer-flanges of the balls F, which latter, as in my previous patent, are made open and afterward closed by a lid with a dovetailed joint. This enables the ball to be molded under compression both inside and out, so that the wall is uniform and free from imperfections. Inflation is accomplished as in previous patent.

G is the band or ring which encircles the ball and bears against the elongated buffer-flanges E', and H represents the spring-clips, which have a barbed and arrow head *h*, Fig. 5, and which pass over and encircle the ring G and thence through the small holes D in the flanges E' and engage with the ground face B of rim of wheel, thereby firmly latching or clamping the sections or balls of the tire to the rim of the wheel.

In Figs. 6 and 7, 8 and 9, and 10 and 11 I have shown different modifications of the spring clips or arms for latching or clamping the sections or segments to the rim of the wheel. Referring to Figs. 6 and 7, the holes D in the ground face B are made of keyhole construction, and the ring G has rigidly secured to it four arms or projections J, having little buttons K at end thereof. These pass through the openings D, and the sections are slightly pushed forward, when the buttons become locked in the narrow end of the openings D. In Figs. 8 and 9 the ends of the projections J have springy ends, so that after passing through the openings D the ends spring out and engage with the under surface of the rim-face B. In Figs. 10 and 11 in place of the holes D, I have a slot K' on each side of the plate, and the clip in this case passes through the slots, when the springy piece *m* springs out and similarly engages with the under side of the ground face of the rim and so clamps or latches the sections or segments to the rim of the wheel.

Of course there may be other forms of spring or latch attachments which might equally serve the same purpose.

I claim—

1. A tire-section comprising a ball having buffer-flanges which are formed with openings, bands extending alongside the ball, across the buffer-flanges, over the said openings, and the radial arms extending from the bands through the openings, and having heads for engaging the ground face of the rim of a wheel; substantially as described.

2. A tire-section comprising a ball having buffer-flanges which are formed with openings, a band encircling the balls above the said openings, and radial spring-clips straddling the band, extending through the openings, and having arrow-heads for engaging the ground face of the rim; substantially as described.

In testimony whereof I affix my signature in presence of two witnesses.

WILLIAM HERBERT SEWELL.

Witnesses:
 EDITH MARY EDMONDSTONE,
 KATHERINE HAMILTON.